(12) United States Patent
Amat

(10) Patent No.: US 10,407,159 B2
(45) Date of Patent: Sep. 10, 2019

(54) REINFORCED BLADE AND SPAR

(71) Applicant: Ratier-Figeac SAS, Figeac (FR)

(72) Inventor: Pascal Amat, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 113 days.

(21) Appl. No.: 15/806,502

(22) Filed: Nov. 8, 2017

(65) Prior Publication Data
US 2018/0127088 A1 May 10, 2018

(30) Foreign Application Priority Data

Nov. 8, 2016 (EP) ..................... 16306462

(51) Int. Cl.
| | | |
|---|---|---|
| B64C 11/26 | (2006.01) | |
| B32B 5/18 | (2006.01) | |
| B32B 7/08 | (2019.01) | |
| B32B 27/06 | (2006.01) | |
| B32B 27/40 | (2006.01) | |
| D05B 69/32 | (2006.01) | |
| B64C 11/20 | (2006.01) | |

(52) U.S. Cl.
CPC ........... B64C 11/26 (2013.01); B32B 5/18 (2013.01); B32B 7/08 (2013.01); B32B 27/065 (2013.01); B32B 27/40 (2013.01); B64C 11/205 (2013.01); D05B 69/32 (2013.01); B32B 2266/0278 (2013.01); B32B 2603/00 (2013.01)

(58) Field of Classification Search
CPC ....... B64C 11/26; B64C 11/205; D05B 69/32; B32B 5/18; B32B 7/08; B32B 27/065; B32B 27/40; B32B 2266/0278; B32B 2603/00
See application file for complete search history.

(56) References Cited

U.S. PATENT DOCUMENTS

| | | |
|---|---|---|
| 1,901,864 A | 3/1933 | Bellanca |
| 4,206,895 A | 6/1980 | Olez |
| 4,664,961 A | 5/1987 | Vees et al. |
| 5,308,228 A | 5/1994 | Benoit et al. |
| 6,024,325 A | 2/2000 | Carter |

(Continued)

FOREIGN PATENT DOCUMENTS

| | | |
|---|---|---|
| FR | 2684719 A1 | 6/1993 |
| GB | 2249592 A | 5/1992 |
| GB | 2288441 A | 10/1995 |

OTHER PUBLICATIONS

European Search Report for application No. 16306462.9-1754 dated May 17, 2017, 7 Pages.

*Primary Examiner* — Hieu T Vo
(74) *Attorney, Agent, or Firm* — Cantor Colburn LLP

(57) ABSTRACT

A spar for a propeller blade comprises central structural member extending from a root to a tip of the spar. A first portion of the central structural member extends from the root of the spar and a second portion extends from the tip and adjoins the first portion. The central structural member includes a first plurality of plies of composite material on a pressure side thereof and a second plurality of plies of composite material on a suction side thereof wherein the first plurality of plies are in contact with the second plurality of plies in the second portion from a leading edge to a trailing edge thereof. A plurality of yarns extends through the central structural member in at least the second portion.

20 Claims, 1 Drawing Sheet

(56) References Cited

U.S. PATENT DOCUMENTS

| | | |
|---|---|---|
| 6,431,837 B1 | 8/2002 | Velicki |
| 7,247,212 B2 | 7/2007 | Kostar et al. |
| 7,600,978 B2 | 10/2009 | Vance et al. |
| 8,357,323 B2 | 1/2013 | Morrison et al. |
| 9,248,612 B2 | 2/2016 | Zhu et al. |
| 2018/0128112 A1* | 5/2018 | Amat ............... B65H 51/00 |

* cited by examiner

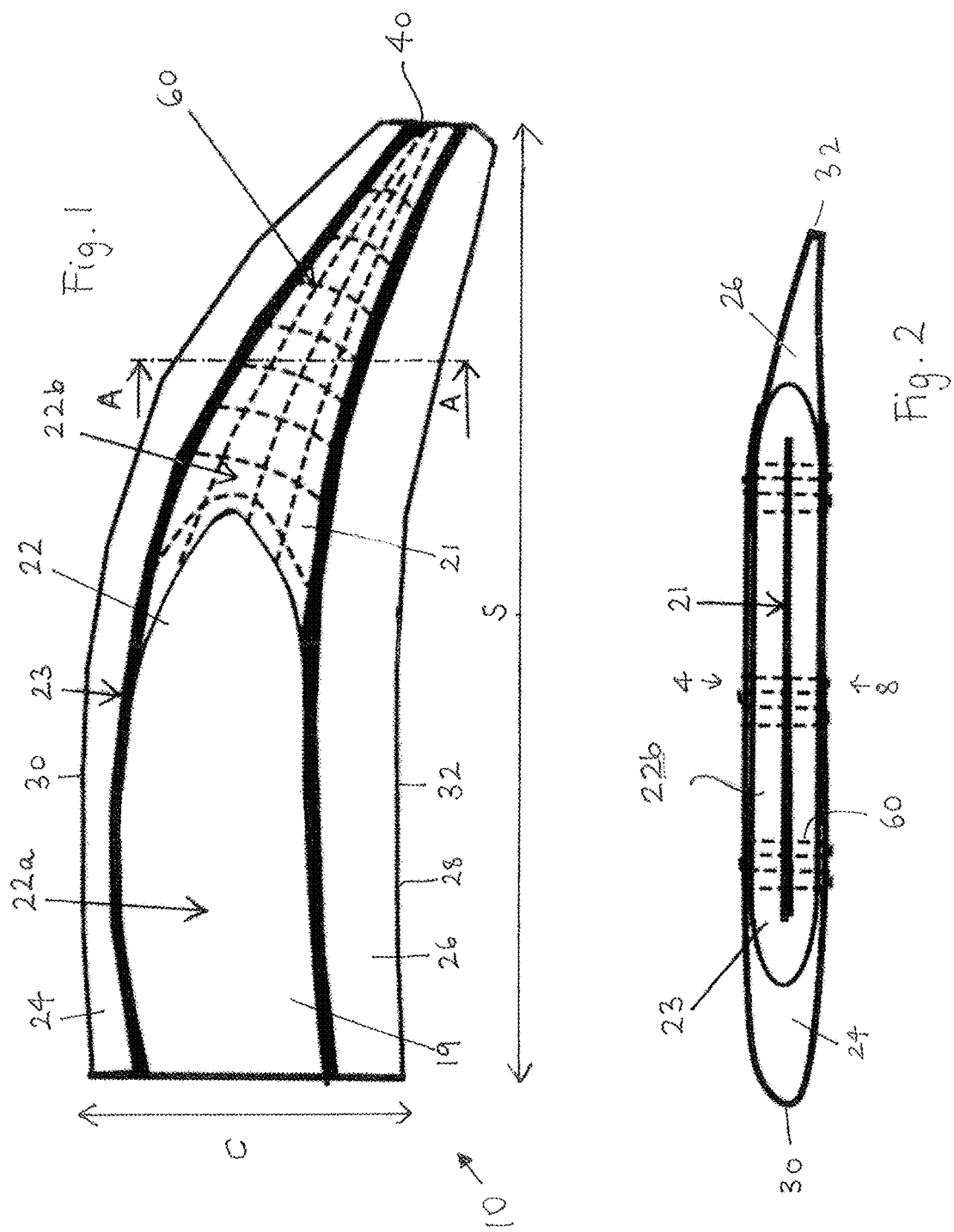

REINFORCED BLADE AND SPAR

FOREIGN PRIORITY

This application claims priority to European Patent Application No. 16306462.9 filed Nov. 8, 2016, the entire contents of which is incorporated herein by reference.

TECHNICAL FIELD

The present disclosure relates to reinforced propeller blades and reinforced spars for propeller blades.

BACKGROUND

The efficiency of a propeller blade may be improved by decreasing the aerodynamic thickness of the profile of the propeller blade. However, reducing the thickness of a propeller blade also reduces the structural integrity of the blade. Propeller blades may need a high damage tolerance capacity in order to prevent foreign object damage (FOD) from bird impact, for example.

Propeller blades may include a structural spar to increase the structural strength of the blade. The thickness of the spar therefore limits the reduction in thickness of the propeller blade.

SUMMARY

From a first aspect, this disclosure provides a spar for a propeller blade comprising a central structural member extending from a root to a tip of the spar. A first portion of the central structural member extends from the root of the spar and a second portion extends from the tip and adjoining the first portion. The central structural member includes a first plurality of plies of composite material on a pressure side thereof and a second plurality of plies of composite material on a suction side thereof wherein the first plurality of plies are in contact with the second plurality of plies in the second portion from a leading edge to a trailing edge thereof A plurality of yarns extends through the central structural member in at least the second portion.

The spar may comprise a core region between the first and second plurality of plies in the first region only. The core region may comprise a lightweight core material such as foam, honeycomb or balsa.

The second portion may extend along less than 70% of the span but greater than 20% of the span adjacent the tip, for example the second portion may extend along about a third of the span adjacent the tip.

The core material may surround the central structural member in the first region only.

The spar may further comprise an outer structural member surrounding the core and central structural member along the entire span of the spar. The outer structural member may comprise unidirectional plies and may have a variable thickness around the circumference of the spar The yarns may extend through the outer structural member and the central structural member The central structural member may have a maximum thickness adjacent a leading edge of the spar and a minimum thickness adjacent a trailing edge of the spar. For example, a greater number of plies of the central structural member may be positioned adjacent a leading edge than adjacent the trailing edge of the spar.

The yarns may be positioned at a plurality of positions across a chord width of the spar.

A single yarn may extend through the thickness of the spar more than once at different positions across the chord of the spar.

The spacing between adjacent yarns or portions of yarns extending through the thickness of the spar may be constant or the spacing between adjacent yarns or portions of yarns extending through the thickness of the spar may be greater towards the trailing edge of the spar.

A propeller blade may comprise the spar as set forth in any of the embodiments above.

The spar may extend along substantially the entire length of the propeller blade.

The yarns may be formed from carbon fibre.

From a further aspect, this disclosure provides a method of manufacturing a spar for a propeller blade comprising forming a central structural member having a first portion extending from the root of the spar and a second portion extending from the tip and adjoining the first portion, the central structural member including a first plurality of plies of composite material on a pressure side thereof and a second plurality of plies of composite material on a suction side thereof wherein the first plurality of plies are in contact with the second plurality of plies in the second portion from a leading edge to a trailing edge thereof and threading a plurality of yarns through the central structural member at least in a portion without the central region therein.

The method may further comprise forming a central region within between the first plurality of plies and the second plurality of plies in the first portion only The threading may be performed with a vibrating needle or by tufting.

The central structural member may be a pre-preg laminate sheet and the central region may comprise a lightweight core material such as foam, honeycomb or balsa, in a portion of the spar adjacent a root thereof.

The method of any of claims 18 to 20, further comprising surrounding the core material with an outer structural member, wherein the plurality of yarns extend through both the outer structural member and the central structural member.

BRIEF DESCRIPTION OF DRAWINGS

Some embodiments of the disclosure will now be described by way of example only and with reference to the accompanying drawings in which:

FIG. 1 shows a portion of a propeller blade according to an embodiment of the invention; and FIG. 2 shows a cross-sectional view of the propeller blade of FIG. 1 taken through line A-A.

DETAILED DESCRIPTION

With reference to FIG. 1, an exemplary propeller blade 10 is illustrated. The propeller blade 10 has a leading edge 30, a trailing edge 32 a root (not shown) and a tip 40. The blade 10 further includes a structural spar 22, a leading edge insert 24 and a trailing edge insert 26.

The structural spar 22 includes a central structural member 21, a spar foam material 19 surrounded by the central structural member 21 along a portion of the length of the central structural member 21 and an outer structural member 23, surrounding central structural member 21 and the spar foam 19 along the entire length of the spar 22. Although the described embodiment includes a spar foam material 19 in a central region thereof, it will be appreciated that the disclosure is applicable to hollow spars having a hollow central region with little or no foam material therein and spars having no core at all.

The central structural member 21 may be formed from pre-impregnated laminate sheets (pre-pregs). The pre-pregs may be impregnated with resin or thermoplastic material. Pre-pregs may increase the stiffness of the foam to facilitate braiding thereon, by reducing or preventing bending or deflection of the foam. Pre-pregs may also help prevent infiltration of resin into the foam material during construction of the spar. The spar foam 19 is formed from PU (polyurethane) foam material, although other foam or lightweight materials may be used, such as honeycomb materials or balsa. The outer structural member 23 may be in the form of a braided layer, for example comprising carbon fibres, although other structural materials may be used. In embodiments, the outer structural member 23 comprises unidirectional plies of carbon fibres.

The leading edge and trailing edge inserts 24, 26 are positioned adjacent the leading edge and trailing edge of the spar 22 respectively and are surrounded by a shell 28, for example, a Kevlar® sock. In alternative embodiments the shell 28 could be in the form of a glass fibre or carbon fibre shell.

The spar 22 as described above may be formed by the following method, although other methods may be used.

Two or more plies of pre-preg material for forming the central structural member 21 may be positioned on opposite sides of a spar mould. The mould may then be closed such that the outboard portions of the pre-preg plies are clamped and in compression. An adhesive may be applied to the pre-preg material. The adhesive may serve to avoid the spar foam material 19 infiltrating the central structural member 21. The spar foam 19 may then be injected into the mould. The carbon outer structural member 23 may then be braided onto the outer surface of the central structural member 21. The spar assembly 22 may then be placed in a blade mould such that foam may then be injected into the mould to form the leading edge and trailing edge foam inserts 24, 26. Alternatively the leading edge and trailing edge inserts 24, 26 may be formed separately from the spar 22, for example by machining, and subsequently attached to the spar 22 in a separate step.

The thickness of the spar foam 19 i.e. from the pressure side 8 to the suction 4 side of the blade (as shown in FIG. 2), decreases along the span S of the propeller blade 10 towards the tip 40. The spar 22 has a first region 22a adjacent the root of the blade 10 and a second region 22b adjacent the tip 40 of the blade 10. In embodiments, the second region 22b may extend along about one third of the length of the blade 10 from the tip 40. In the illustrated embodiment, the spar foam 19 extends along the spar 22 from the root to the end of the first region 22a such that there is no foam 19 in the second region 22b of the spar 22. However it will be appreciated that, in other embodiments a very thin layer of foam material, for example less than 5 mm in thickness, may be present in the second region 22b adjacent the tip 40 of the spar 22.

As a result of the above mentioned structure, the second region 22b has a lesser thickness than the thickness of the first region 22a. For example the thickness of the first region 22a could be about 100 mm at the root. The thickness of the first region 22a may gradually reduce along the length of the blade 10 towards the second region 22b such that the thickness of the spar 22 at the junction between the first region 22a and the second region 22b is only a few millimetres, for example the thickness at the junction may be less than 30 mm for example less than 20 mm or less than 10 mm. The thickness of the second region 22b may be constant or may also reduce along the length of the blade 10 towards the tip 40.

The thickness of the central structural member 21 may decrease from a maximum thickness at or near the leading edge of the spar 22 to a minimum thickness at the trailing edge of the spar 22. The central structural member 21 may be formed from a plurality of plies wherein the thickness of the plies decreases from the leading edge towards the trailing edge of the central structural member 21. The central structural member 21 may also include plies of constant thickness. Additionally or alternatively, the thickness of the central structural member 21 may be varied by having a greater number of plies in the leading edge than the trailing edge of the central structural member 21. Alternatively, the thickness of the spar 22 may be modified by increasing the thickness of the outer structural member 23 adjacent the leading edge by increasing the thickness of the unidirectional plies in this region. In such an embodiment, the thickness of the outer structural member 23 may be controlled using the braiding process. For example, the unidirectional plies may be braided onto the spar 22 using 6 ends per grommet (for example). The number of ends per grommet may be progressively reduced around the braiding wheel so as to deposit more ends in the leading edge region than the trailing edge region to decrease the unidirectional ply thickness towards the trailing edge.

In order to increase the damage tolerance capacity and resistance to foreign object damage (e.g. bird impact strength) in the second region 22b of the spar 22, reinforcing yarns 60 extend through the thickness of the spar 22 in the second region 22b. The yarns 60 are threaded into the spar 22 as will be described in detail below.

Referring back to FIG. 1, it can be seen that the stitches of yarn 60 are distributed across the chord C and the span S of the blade 10 within the second region 22b. The yarns 60 may extend through the spar 22 only or may extend through the spar 22 and the shell 28. The yarns 60 may extend through the central structural member 21 and the outer structural member 23. Additionally or alternatively, the yarns 60, may also extend into the first region 22a towards the root, for example the yarns 60 may extend along the entire span S of the blade 10 or spar 22 from the tip 40 and up to the root. In these embodiments, the yarns may extend through the outer structural member 23 and shell 28. Having the yarns 60 extend into the first region 22a may also improve tolerance to damage of the blade 10 and/or spar 22 and may improve the out of plane properties of the blade 10 and/or spar 22. This might be particularly beneficial for embodiments without a foam core.

The yarns 60 may be arranged such that a single yarn 60 extends through the thickness of the spar 22 more than once. For example, a single yarn 60 may extend through the thickness of the spar 22 three or more times over a portion or the entire width of the spar in the chord direction. Additionally or alternatively, a single yarn 60 may extend through the thickness of the spar 22 three or more time over a portion of the spar in the span direction. Such yarns may be threaded through the spar 22 or blade 10 in any number of ways as known in the art. For example, the yarns 60 may be threaded through the spar 22 using a stitching machine or by tufting. Stitching could be performed by various methods as known in the art including with or without knots. In embodiments, the stitching may be performed with a vibrating needle. The vibration applied to the needle facilitates puncturing of the central structural member 21. Tufting may involve inserting the yarns 60 through the spar 22, using a needle that, after insertion, moves back along the same trajectory leaving a loop of the yarn 60 on the bottom of the structure. All of the above-described threading techniques may be performed automatically. For example, stitching may be performed by a robot having a stitching head and needle mounted thereto.

Each yarn 60 or portion of yarn 60 extending through the spar 22 may be spaced from an adjacent yarn 60 or portion of yarn 60 extending through the spar 22 by a uniform distance across the chord or span of the spar 22 or blade 10. For example the yarns might be spaced between 3 and 15 millimetres apart, for example 5 millimetres in either or both of the chord or span direction. The spacing between the yarns 60 may vary across the chord of the spar 22. For example, the space between adjacent yarns 60 may be greater towards the trailing edge of the spar 22 than the space between adjacent yarns towards the leading edge of the spar 22 or vice versa.

Each yarn 60 may be formed from a dry carbon, glass or Kevlar® dry fibre material and may include a plurality of filaments of dry fibre material twisted with or bonded with one another to form a yarn 60.

The number of filaments in the yarn 60 may vary across the chord of the spar 22. For example, yarns 60 extending through the spar 22 adjacent the leading edge of the spar 22 may include more filaments than yarns 60 adjacent the trailing edge of the spar 60.

Both the yarns 60 adjacent the blade tip 40 help reduce the aerodynamic thickness of the blade's profile and thereby increase the efficiency of the blade 10. The yarns may further improve static and fatigue inter-laminar shear strengths (ILSS) of the composite blade 10 and improve damage tolerance and FOD strength.

The invention claimed is:

1. A spar for a propeller blade comprising:
a central structural member extending from a root to a tip of the spar, a first portion of the central structural member extending from the root of the spar and a second portion extending from the tip and adjoining the first portion, the central structural member including a first plurality of plies of composite material on a pressure side thereof and a second plurality of plies of composite material on a suction side thereof wherein the first plurality of plies are in contact with the second plurality of plies in the second portion from a leading edge to a trailing edge thereof; and
a plurality of yarns extending through the central structural member in at least the second portion.

2. The spar of claim 1, further comprising a core region between the first and second plurality of plies in the first region only.

3. The spar of claim 2, wherein the core region comprises a lightweight core material such as foam, honeycomb or balsa.

4. The spar of claim 1, wherein the second portion extends along less than 70% of the span (S) but greater than 20% of the span (S) adjacent the tip, for example wherein the second portion extends along about a third of the span (S) adjacent the tip.

5. The spar of claim 1, further comprising an outer structural member surrounding the core region and central structural member along the entire span of the spar.

6. The spar of claim 5, wherein the outer structural member comprises unidirectional plies and has a variable thickness around the circumference of the spar.

7. The spar of claim 5, wherein the yarns extend through the outer structural member and the central structural member.

8. The spar of claim 1, wherein the central structural member has a maximum thickness adjacent a leading edge of the spar and a minimum thickness adjacent a trailing edge of the spar.

9. The spar of claim 8, wherein a greater number of plies of the central structural member are positioned adjacent a leading edge than adjacent the trailing edge of the spar.

10. The spar of claim 1, wherein the yarns are positioned at a plurality of positions across a chord (C) of the spar.

11. The spar of claim 1, wherein a single yarn extends through the thickness of the spar more than once at different positions across the chord (C) of the spar.

12. The spar of claim 1, wherein the spacing between adjacent yarns or portions of yarn extending through the thickness of the spar is constant.

13. The spar of claim 1, wherein the spacing between adjacent yarns or portions of yarn extending through the thickness of the spar is greater towards the trailing edge of the spar.

14. A propeller blade 10 comprising the spar as set forth in claim 1.

15. The propeller blade of claim 14, wherein the spar extends along substantially the entire span (S) of the propeller blade.

16. A method of manufacturing a spar for a propeller blade comprising:
forming a central structural member having a first portion extending from the root of the spar and a second portion extending from the tip and adjoining the first portion, the central structural member including a first plurality of plies of composite material on a pressure side thereof and a second plurality of plies of composite material on a suction side thereof wherein the first plurality of plies are in contact with the second plurality of plies in the second portion from a leading edge to a trailing edge thereof; and
threading a plurality of yarns through the central structural member at least in the second portion.

17. The method of claim 16, further comprising forming a central region between the first plurality of plies and the second plurality of plies in the first portion only.

18. The method of claim 16, wherein the threading is performed with a vibrating needle or by tufting.

19. The method of claim 16, wherein the central structural member is a pre-preg laminate sheet and the central region comprises a lightweight core material such as foam, honeycomb or balsa, in a portion of the spar adjacent a root thereof.

20. The method of claim 16, further comprising surrounding the central structural member with an outer structural member, wherein the plurality of yarns extend through both the outer structural member and the central structural member.

* * * * *